May 26, 1959 R. T. WINDSOR 2,888,233
PILOT OPERATED VALVE
Filed Aug. 6, 1956
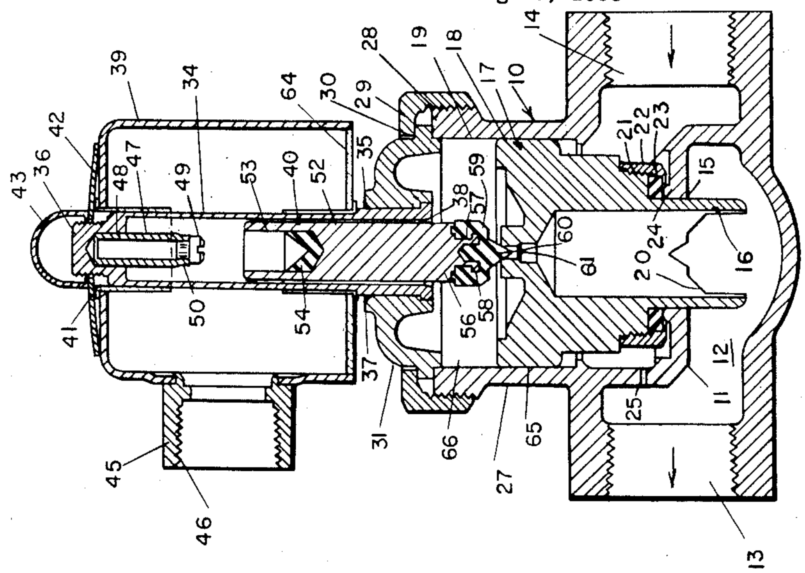
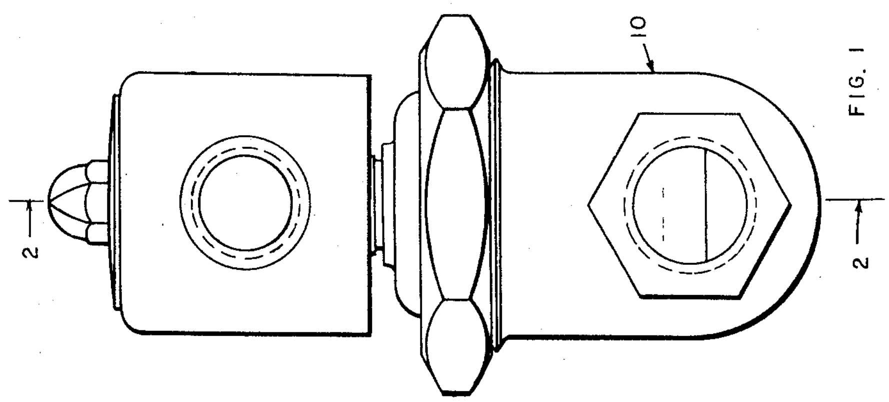
INVENTOR.
RICHARD T. WINDSOR
BY Charles L. Lovercheck
Attorney

United States Patent Office 2,888,233

Patented May 26, 1959

1

2,888,233

PILOT OPERATED VALVE

Richard T. Windsor, Erie, Pa., assignor to Hays Manufacturing Company, Erie, Pa., a corporation of Pennsylvania Application August 6, 1956, Serial No. 602,155

8 Claims. (Cl. 251—30)

This invention relates to valves and more particularly to solenoid valves of the type generally known as pilot operated valves.

In the operation of solenoid pilot operated valves, a problem exists of providing a quiet operating valve wherein the plunger of the valve will not vibrate when withdrawn from the pilot orifice by the solenoid. This is partly due to the fact that the plunger in a conventional valve will strike a rigid stop with an impact when withdrawn by the solenoid and, further, due to the fact that the plunger will vibrate due to the alternating current actuating the solenoid.

The present invention attempts to overcome the problems encountered with prior valves by providing an insert of magnetic rubber in a guide aperture in a plunger and by utilizing a shaded pole principle in the guiding means for the plunger. This shading pole provides an intermediate excitation for the field and, therefore, holds the plunger rigid between A.C. current cycles. The valve is provided with a specific type of rubber tip on the plunger to further enchance the quiet closing of the valve. Also, the end of the plunger adjacent the tip thereof is oversized to hold the plunger against vibrations.

It is, accordingly, an object of this invention to overcome the disadvantages, operational difficulties, and structural difficulties of prior valves and, more particularly, it is an object of the present invention to provide a valve which is simple in construction, economical, to manufacture, and simple and efficient in operation.

Another object of the invention is to provide a solenoid operated valve wherein vibration of the plunger due to the excitation of the solenoid by intermittent electrical current is greatly reduced.

A further object of the invention is to provide a specific means for reducing vibration of a solenoid operated valve.

A still further object of the invention is to provide a design of plunger for a solenoid operated valve wherein the plunger has a buffer of magnetic rubber at one end and a resilient member on the other end thereof.

Yet another object of this invention is to provide an improved plunger and solenoid combination in a solenoid operated valve.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is an end view of a valve according to the invention; and

Fig. 2 is a cross sectional view of the valve shown in Fig. 1 taken on line 2—2 thereof.

Now with more specific reference to the drawing, a valve is shown having a hollow body 10 with a partition 11 forming a closure across a hollow 12 and having a threaded inlet 13 and an outlet 14. The partition 11 has an aperture 15 through which a portion 16 of a plunger 17 extends. The plunger 17 has a guide portion 18 which slides in a lateral bore 19 of the valve. The portion 16 is integral with the portion 18 and the guide portion 18 has a V-shaped slot 20 therein. The V-shaped slot 20 cuts off the flow of fluid gradually as the valve closes and thus eliminates water hammer when the valve closes.

The lower portion of the plunger 17 has a reduced size and is threaded at 21 to receive a collar 22 which clamps a resilient seat washer 23 thereon. The seat washer 23 is adapted to rest on a seat 24 when the valve is closed. An aperture 25 may be formed in the partition 11 and it is especially adapted for use as a bypass when the valve is used in air conditioning installations.

An outwardly directed portion 27 is integral with the valve body 10 and the hollow 12 thereof receives the plunger 17. The upper portion of the outwardly directed portion 27 is threaded at 28 to receive a coupling nut 29. The coupling nut 29 rests on a ledge 30 of a bonnet 31 to hold the bonnet 31 in place.

A tubular solenoid adapter 34 is made of non-magnetic material and forms a magnetic gap between ferrules 40 and 41. The solenoid adapter 34 is supported in a bore 35 in the bonnet 31. The solenoid adapter 34 is hollow, open at one end and closed at the other end thereof, and terminates in a threaded member 36. The solenoid adapter 34 is soldered to the bonnet 31 at 37 and has a counterbore 38 at the lower end thereof. A solenoid cover 39 is held in place on the solenoid adapter 34 by means of the lower ferrule 40 and the upper ferrule 41 which fit into the upper and lower ends of the solenoid cover 39. A solenoid is disposed in the solenoid cover 39 and the lower end of the solenoid cover 39 is closed by a solenoid washer 64. A washer 42 is supported on the threaded member 36 of the solenoid adapter 34 and bears down on the solenoid cover 39 and a nut 43 threadably engages the upper end of the solenoid adapter 34. A second adapter 45 is fixed to the solenoid cover 39. The adapter 45 is threaded at 46 to receive an electrical conduit. The inner upper end of the solenoid adapter 34 has a shading coil 47 which is attached to the inside of the solenoid adapter 34 at 48 and is preferably made of tubular copper. A shading pole 49 is supported in the lower end 50 of the shading coil 47.

A plunger 52 is made of a solid cylindrical piece of magnetic material such as iron and is bored at the top at 53. In the bottom of the bore 53, a piece of magnetic rubber or plastic 54 is molded or inserted. The magnetic rubber 54 has a concave upper end which receives the end of the shading pole 49. The rubber or plastic 54 is made magnetic by impregnating it with particles or pieces of iron or other magnetic material. The bore 53 receives the shading coil 47 when the plunger 52 is excited and the shading pole 49 attracts the magnetic rubber 54 between alternating current cycles, thereby holding the plunger 52 against vibration, the magnetic rubber 54 serving both as a buffer and a magnetic path. A lower end 56 of the plunger 52 has a reduced size portion 57 and a flange 58 on the end thereof. A rubber tip 59 has a point 60 thereon which engages a pilot orifice 61 in the piston or plunger 52.

During operation, the valve is connected in a fluid line with flow in the direction indicated by the arrows. The fluid pressure will leak up past a surface 65 of the piston 52 and into a chamber 66 thereabove. The area above the piston 52 in the chamber 66 being greater than the area below the piston 52, a net force will be exerted on the piston 52 to force it downward and hold the valve in closed position. When it is desired to open the valve, the solenoid in the solenoid cover 39 will be excited. This will lift the plunger 52 to bring the bore 53 of the plunger 52 up around the shading coil 47 and open the pilot orifice 61. This will relieve the pressure in the chamber 66 and since the pressure is maintained constant below the piston, the piston will be forced upwardly, causing fluid to flow through the slot 20 and through the aperture 15. When the solenoid is de-energized, the plunger 52 will be released by the solenoid and it will close the orifice 61 and fluid will leak up past the surface 65 to again apply enough pressure to the top of the piston to close it.

It will be noted that the outside diameter of the member 57 is greater than the outer diameter of the plunger 52 and the rubber member 57 will prevent the metal plunger 52 from striking the counterbore 38 when the solenoid is excited, thereby further reducing the noise of metal to metal contact during vibration.

The foregoing specification sets forth the invention in its preferred practical form but the structure shown is capable of modification within a range of equivalents without departing from the invention which it is to be understood is broadly novel as is commensurate with the appended claims.

The embodiments of the invention in which an exclusive property or privilege is claimed are defined as follows:

1. A valve comprising a hollow body having a fluid passage therethrough, means to control the flow of fluid through said fluid passage, said means having a pilot orifice therethrough, a plunger, solenoid means disposed around said plunger, said plunger having means on one end thereof to close said pilot orifice and an axial bore in the end thereof remote from said pilot closing means, a member supported on said solenoid means adapted to be received in said axial bore, and resilient means in said axial bore engaging said member when said solenoid means is excited whereby said plunger is held against vibration, said resilient means in said bore comprising a piece of resilient material having iron embedded therein, said iron in said resilient material completing a magnetic circuit for lines of force from said solenoid means, thereby aiding the out of phase lines of force from a shading pole comprising said member supported on said solenoid means.

2. The valve recited in claim 1 wherein said means to close said pilot orifice comprises a resilient member concentric with said plunger and slightly larger than said plunger, and a fixed hollow member supported on said body concentric with said plunger and adapted to receive said resilient orifice control member.

3. The valve recited in claim 2 wherein said first mentioned member comprises a tubular cylindrical member of electrical conducting material and a solid metallic member attached to the distal end of said first mentioned member.

4. A valve comprising a hollow body having a flow passage therethrough, an apertured partition in said flow passage, a piston supported in said hollow body, said piston having means on one end thereof adapted to close said apertured partition, a hollow solenoid support, a solenoid on said solenoid support, and a plunger slidable in said solenoid support, one end of said plunger having a resilient member thereon adapted to engage said aperture in said piston, said resilient member being larger in diameter than said plunger and adapted to fit into said hollow in said support when said plunger is retracted, the other end of said plunger having an axial bore with a magnetic resilient member therein, and a shading pole supported on said solenoid support and adapted to engage said resilient member when said solenoid attracts said plunger and moves it out of engagement with said piston.

5. The valve recited in claim 4 wherein said shading pole is supported on said solenoid support by means of a tubular member made of electrical conducting material.

6. The valve recited in claim 5 wherein said solenoid support has a counterbore in the end thereof and said resilient member on said plunger is received in said counterbore.

7. The valve recited in claim 5 wherein said resilient member has a conical recess in its outer side and said shading pole is adapted to engage said recess side whereby said plunger is held against vibration.

8. A valve comprising a hollow body, pilot operated means to control the flow of fluid through said body, a hollow solenoid adapter fixed on said body, a solenoid on said adapter, a plunger made of magnetic material telescopically disposed in said adapter, a resilient point on one end of said plunger adapted to engage an aperture through said pilot operated means, an axial bore in the opposite end of said plunger, a shading pole supported in said solenoid adapter and adapted to be received in said axial bore, and a resilient member in said axial bore adapted to engage said shading pole, the end of said solenoid adapter adjacent said valve being counterbored, said resilient point being larger in diameter than said plunger and adapted to be received by said counterbore whereby said plunger is held against lateral vibration.

References Cited in the file of this patent

UNITED STATES PATENTS

| | | |
|---|---|---|
| 893,305 | Cheney | July 14, 1908 |
| 2,181,423 | Gille | Nov. 28, 1939 |
| 2,251,441 | Dillman | Aug. 5, 1941 |
| 2,336,887 | Piron | Dec. 14, 1943 |
| 2,587,357 | McPherson | Feb. 26, 1952 |
| 2,629,401 | Miller | Feb. 24, 1953 |